(12) United States Patent
Costa et al.

(10) Patent No.: US 11,577,187 B2
(45) Date of Patent: Feb. 14, 2023

(54) REINFORCED SPIN ON RECHARGEABLE FILTER AND RELATED METHOD OF MANUFACTURE

(71) Applicant: Sogefi Air & Cooling USA, Inc., Rochester Hills, MI (US)

(72) Inventors: Anderson Costa, Rochester Hills, MI (US); Adilson Lima, Shelby Township, MI (US); Steven Dara, Rochester Hills, MI (US)

(73) Assignee: Sogefi Air & Cooling USA, Inc., Rochester Hills, MI (US)

( * ) Notice: Subject to any disclaimer, the term of this patent is extended or adjusted under 35 U.S.C. 154(b) by 80 days.

(21) Appl. No.: 17/230,740

(22) Filed: Apr. 14, 2021

(65) Prior Publication Data
US 2022/0203276 A1   Jun. 30, 2022

Related U.S. Application Data

(60) Provisional application No. 63/132,786, filed on Dec. 31, 2020.

(51) Int. Cl.
*B01D 29/21* (2006.01)
*B01D 35/30* (2006.01)
*B01D 35/153* (2006.01)

(52) U.S. Cl.
CPC .......... *B01D 35/306* (2013.01); *B01D 29/21* (2013.01); *B01D 35/153* (2013.01); *B01D 35/308* (2013.01); *B01D 2201/0415* (2013.01); *B01D 2201/12* (2013.01); *B01D 2201/167* (2013.01); *B01D 2201/291* (2013.01);
(Continued)

(58) Field of Classification Search
CPC .... B01D 35/306; B01D 29/21; B01D 35/153; B01D 35/308; B01D 2201/0415; B01D 2201/12; B01D 2201/167; B01D 2201/291; B01D 2201/347; B01D 2201/4046; B01D 2201/4092; B01D 2201/4015; B01D 35/30; B01D 35/147; B01D 2201/295; B01D 2201/4076
See application file for complete search history.

(56) References Cited

U.S. PATENT DOCUMENTS

| 4,246,109 A | 1/1981 | Manders |
| 4,540,489 A | 9/1985 | Barnard |

(Continued)

FOREIGN PATENT DOCUMENTS

| DE | 4124322 A1 * | 1/1993 | ............. B01D 35/30 |
| DE | 4124322 A1 | 1/1993 | |

(Continued)

*Primary Examiner* — Waqaas Ali
(74) *Attorney, Agent, or Firm* — Warner Norcross + Judd LLP

(57) ABSTRACT

A rechargeable spin-on filter includes a cover, a housing threadably joined with the housing, and a filter element can be replaced with another filter element relative thereto. The cover and/or housing can be plastic. The cover can include a bottom plate having inlet ports and an outlet port. The bottom plate can be reinforced with an optionally metal reinforcing plate that registers and locks relative to the bottom plate via locking elements, in the form of corresponding apertures and projections or tabs that interfit with one another. A related method is provided.

20 Claims, 8 Drawing Sheets

(52) U.S. Cl.
CPC .......... *B01D 2201/347* (2013.01); *B01D 2201/4046* (2013.01); *B01D 2201/4092* (2013.01)

(56) References Cited

U.S. PATENT DOCUMENTS

| | | | |
|---|---|---|---|
| 5,413,712 A | 5/1995 | Gewiss et al. | |
| 5,548,893 A * | 8/1996 | Koelfgen | B01D 35/153 29/888.011 |
| 5,695,633 A | 12/1997 | Ernst et al. | |
| 6,016,923 A | 1/2000 | Baumann | |
| 6,068,763 A | 5/2000 | Goddard | |
| 6,221,242 B1 | 4/2001 | Deibel et al. | |
| 6,228,274 B1 | 5/2001 | Deibel et al. | |
| 6,235,194 B1 | 5/2001 | Jousset | |
| 6,391,193 B1 * | 5/2002 | Luka | B01D 27/103 210/DIG. 17 |
| 6,475,379 B2 | 11/2002 | Jousset et al. | |
| 6,568,539 B1 | 5/2003 | Deibel et al. | |
| 6,610,203 B1 | 8/2003 | Jainek | |
| 6,626,787 B2 | 9/2003 | Porter | |
| 6,716,361 B2 | 4/2004 | Deibel et al. | |
| 6,814,681 B2 | 11/2004 | Porter | |
| 6,835,304 B2 | 12/2004 | Jousset et al. | |
| 6,953,411 B2 | 10/2005 | Burns et al. | |
| 7,314,555 B2 | 1/2008 | Koehler et al. | |
| 7,413,089 B1 | 4/2008 | Tidwell | |
| 7,597,202 B1 | 10/2009 | Tidwell | |
| 8,163,056 B2 | 4/2012 | Coulonvaux et al. | |
| 8,293,103 B2 | 10/2012 | Johnson et al. | |
| 8,419,934 B1 | 4/2013 | Robinson | |
| 8,444,735 B2 | 5/2013 | Coulonvaux et al. | |
| 8,474,631 B2 | 7/2013 | Kocksch | |
| 8,523,973 B2 | 9/2013 | Ackermann et al. | |
| 8,753,415 B2 | 6/2014 | Coulonvaux et al. | |
| 8,973,760 B2 | 3/2015 | Ries et al. | |
| 9,056,281 B2 | 6/2015 | Suzuki et al. | |
| 9,724,627 B2 | 8/2017 | Malgorn et al. | |
| 2003/0127402 A1 | 7/2003 | Deibel et al. | |
| 2006/0196822 A1 | 9/2006 | Koehler et al. | |
| 2009/0008320 A1 | 1/2009 | Harder et al. | |
| 2009/0321339 A1 | 12/2009 | Suzuki et al. | |
| 2012/0080372 A1 | 4/2012 | Ries et al. | |
| 2013/0043176 A1 | 2/2013 | Johnson et al. | |
| 2014/0021119 A1 | 1/2014 | Malgorn et al. | |
| 2015/0013292 A1 | 1/2015 | Coulonvaux et al. | |
| 2015/0151226 A1 | 6/2015 | Ries et al. | |
| 2017/0030384 A1 | 2/2017 | Pastori | |
| 2017/0274301 A1 | 9/2017 | Malgorn et al. | |
| 2018/0193780 A1 | 7/2018 | Harrelson et al. | |

FOREIGN PATENT DOCUMENTS

| | | |
|---|---|---|
| DE | 102015222425 A1 | 5/2017 |
| DE | 102017000792 A1 | 8/2018 |
| EP | 1419809 A1 | 5/2004 |
| EP | 1561502 A1 | 8/2005 |
| EP | 1752202 A1 | 2/2007 |
| EP | 2535550 A2 | 12/2012 |
| EP | 2622202 | 8/2014 |
| FR | 2779661 | 12/1999 |
| FR | 3018203 | 9/2015 |
| WO | 9314858 | 8/1993 |
| WO | 02081052 A1 | 10/2002 |
| WO | 2006078587 A2 | 7/2006 |
| WO | 2015050540 A1 | 4/2015 |
| WO | 2017050370 A1 | 3/2017 |
| WO | 2018237252 A1 | 12/2018 |

* cited by examiner

REINFORCED SPIN ON RECHARGEABLE FILTER AND RELATED METHOD OF MANUFACTURE

BACKGROUND OF THE INVENTION

The present invention relates to spin on filters, and more particularly to a spin on filter and replaceable filter element.

Many complex mechanical devices, such as internal combustion engines, motors and hydraulic equipment, require lubrication via the circulation of oil or hydraulic fluid. During circulation in an engine, oil typically becomes contaminated with environmental dirt, dust and debris, as well as metal pieces resulting from wear on mechanical components in the engine. As contaminants build up in the circulating oil, mechanical failures can occur through loss of lubricity. Accordingly, most engines are outfitted with a filtration circuit, typically including a filter.

A common type of oil filter is a spin on filter, which threads onto a corresponding threaded adaptor of the filtration circuit associated with the engine. The filter is thus rotated, or spun on to the adaptor. A typical spin on filter includes among other things, a housing, filter media inside the housing and a cover plate, which typically includes the threads for attachment to the adaptor. These components of the filter frequently are constructed from metal for strength and to withstand the pressure of the oil flowing through the filter, and are welded or crimped together as a single piece unit. When the filter reaches the end of its service life, it can be spun off the adaptor, discarded and replaced with a new filter. Where the components are constructed from metal, however, this can require a robust recycling protocol to ensure the metal is separated, recovered and put to good use. The use of metal for the filter components also can add undesirable weight to the filter. Accordingly, some manufacturers construct parts of the filter housing from plastic, however, this has shortcomings as well because the plastic can have less strength than metal, and can be prone to cracking and/or breakage, particularly in areas of high stress, such as the threads.

Most oil filters also include an internal filtration element. The filtration element is retained in a housing. Dirty oil enters the filter from the engine, circulates through the housing and through the filtration element, which filters or removes contaminants from the dirty oil. The filtered oil then flows back to the engine. Over time, the filtration element can become fouled with the removed contaminants, which can impair the filtering function of the filter as well as affect the flow through the filter and in some cases, through the engine. Some manufacturers construct their filters to include a removable housing, so the filtration element and its media can be accessed and replaced with a new one, rather than replacing the entire oil filter. Such replaceable filtration elements, however, typically include an internal support tube and bypass valve coupled to the filtration media, so those components must be replaced as well. This can consume extra resources as well. Further, these constructions can be fairly complex, requiring extended service time to disassemble, replace, and reinstall the filter elements.

Lastly, for those spin on filters that include a replaceable filtration media, it can be difficult to ensure that high quality, authorized or original equipment manufacturer filter elements are properly used when replacement occurs. Sometimes, lesser quality or inferior aftermarket filter elements can be offered and used instead of authorized or original filter elements. In some cases, this can reduce the efficiency and function of the oil filter, which can be detrimental to its filtering function, and ultimately can cause damage to the engine or oil circulation system.

Accordingly, there remains room for improvement in the field of spin on filters for use with internal combustion engines, motors and hydraulic equipment, particularly to simplify the process for servicing a filter element, to improve strength of the filter and/or to ensure authorized or original filter elements are used with the filters.

SUMMARY OF THE INVENTION

A rechargeable spin on filter includes a cover, a housing threadably joined with the housing, and a filter element configured to be removed and replaced with another filter element relative thereto.

In one embodiment, the cover and/or housing can be constructed from a polymeric material. The cover can include a bottom plate having multiple inlet ports and an outlet port disposed along a longitudinal axis of the filter. The bottom plate can be reinforced with a reinforcing plate, optionally constructed from metal.

In another embodiment, the reinforcing plate registers and locks relative to the bottom plate via locking elements, in the form of corresponding apertures and projections that interfit with one another. This can prevent rotation, separation and/or movement of the reinforcing plate relative to the bottom plate and cover.

In still another embodiment, the projections can be plate lock projections in the form of ribs or tabs associated with the reinforcing plate, and can interfit in corresponding apertures defined in the bottom plate. The ribs or tabs can be bent or deformed to crimp, clamp or otherwise engage the apertures or adjacent parts of the bottom plate to secure those elements to one another and prevent them from rotation and/or separation relative to one another.

In yet another embodiment, the projections can be plate lock projections that are disposed among and between the plate inlet ports that allow fluid, such as oil, which includes as used herein oil, hydraulic fluid, lubricating fluids and the like, into the filter. The projections can be pressed, stamped, formed or otherwise joined with the plate. In some cases, the plate lock projections can be pressed under pressure and/or melted into the cover plate to produce the corresponding apertures in the bottom plate, which the projections fill.

In even another embodiment, the apertures can be cover lock elements in the form of recesses or holes or indentations produced by the projections. Those apertures can be cover lock apertures disposed among and between the cover inlet ports that allow fluid, such as oil, into the filter. In some applications, the cover lock apertures can be made when the projections produce the corresponding apertures in the bottom plate, which the projections fill. The cover lock apertures can be separately formed and distal from the respective cover inlet ports.

In a further embodiment, the reinforcing plate can be a metal plate that includes a collar defining a cover outlet port. The plate can include a base extending outward from the collar to an outer perimeter. Plate inlet ports can be defined in the base between the collar and the outer perimeter. The collar can include threads that threadably couple the filter to a threaded adapter, for example, on an engine, hydraulic device or other equipment.

In still a further embodiment, a method is provided. The method can include providing a cover including a bottom plate; positioning a reinforcing plate, constructed from a different material than the cover, adjacent the bottom plate so that plate inlet ports are in fluid communication with cover inlet ports and so that a plate outlet port is in fluid communication with a cover outlet port; registering a plate lock element with a cover lock element to fixedly secure the reinforcing plate to the cover so that the reinforcing plate is prevented from rotating relative to the bottom plate; installing a replaceable filter element having a central opening aligned with the cover outlet port, so that the filter element is removably disposed in the cover so that the filter element can be selectively removed from the filter; and rotating a housing defining a cavity and having a threaded housing portion so that the threaded housing portion joins with the threaded cover portion with the replaceable filter element disposed in the cavity to house the filter element in the filter.

In yet a further embodiment, the method can include installing a non-return valve in the cover over the reinforcing plate so that the non-return valve contacts an interior surface of the reinforcing plate, but not the bottom plate, and so the non-return valve covers the inlet plate ports.

In even a further embodiment, the method can include providing a collar on the reinforcing plate, the collar including threads; and placing the collar in a flanged ring extending around the cover outlet port of the bottom plate.

In another, further embodiment, the filter element can include an end cap defining a perimeter about an inner dimension, such as an inner diameter. The end cap can define a groove to receive a registration rib of a support tube over which the element installs. Alignment of the rib and groove can index and register the element with the support tube.

In another embodiment, the filter can comprise a filter element including a filter body having a longitudinal axis, a pleated web circumferentiating a longitudinal axis and a central passageway. The pleated web can include a first pleat and a second pleat that form a longitudinal pleat groove. The element can include a first end cap that defines a first central opening aligned with the longitudinal axis. The first central opening can be bounded by a first interior perimeter interrupted by a first end cap groove that extends away from the longitudinal axis. The first end cap groove can be coextensive and aligned with the longitudinal pleat groove.

In still another embodiment, the first end cap groove and longitudinal pleat groove can align with the registration rib extending outward from a support tube and away from the longitudinal axis to index the filter element relative to the support tube when the filter element is installed relative to the support tube to replace a different filter element previously present in the filter.

In even another embodiment, the filter element can include a second end cap that defines a second central opening aligned with the longitudinal axis. The second central opening can be bounded by a second round interior perimeter interrupted by a second end cap groove extending away from the longitudinal axis. The longitudinal pleat groove can be coextensive and aligned with the second end cap groove, and the second end cap groove can be aligned with the first end cap groove.

In a further embodiment, a method is provided. The method can include moving the filter element relative to a support tube, the support tube including an exterior tube perimeter interrupted by an outward extending registration rib, so that the support tube enters a central passageway of the filter element. The registration rib can align with at least one of the first end cap groove and the longitudinal pleat groove when the filter element moves relative to the support tube in the central passageway to index the registration rib relative to one or more of the first end cap groove and the longitudinal pleat groove.

The current embodiments provide a spin on filter that can be easily recharged with a filter element. Where the cover and/or housing of the filter are constructed from plastic, and the reinforcing plate is included, that plate can enhance the strength and rigidity of the filter where it connects to an adapter. With threads included in the reinforcement plate, particularly where the plate is constructed from metal, the threads are rigid, wear minimally, and join with the adapter in a secure, durable manner. Further, the reinforcing plate can add additional strength and integrity to the other plastic parts of the filter under higher operating pressures. In cases where the filter element includes a connected non-return valve, the filter element and that valve efficiently can be replaced to avoid return of oil through the inlet ports of the filter. Where the replaceable filter element includes the groove on an interior dimension or diameter that selectively registers with a corresponding rib on a support tube, alignment, indexing and/or registration of the filter element with the support tube, and optionally a non-return valve with the inlet ports, can be achieved. Further, the registration features of the filter element and the support tube can ensure that high quality, efficient and/or original filter element are used with the filter. This can reduce the likelihood that the filter will not adequately remove contaminants from the oil and damage the engine, machine or hydraulic system, which the filter protects.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
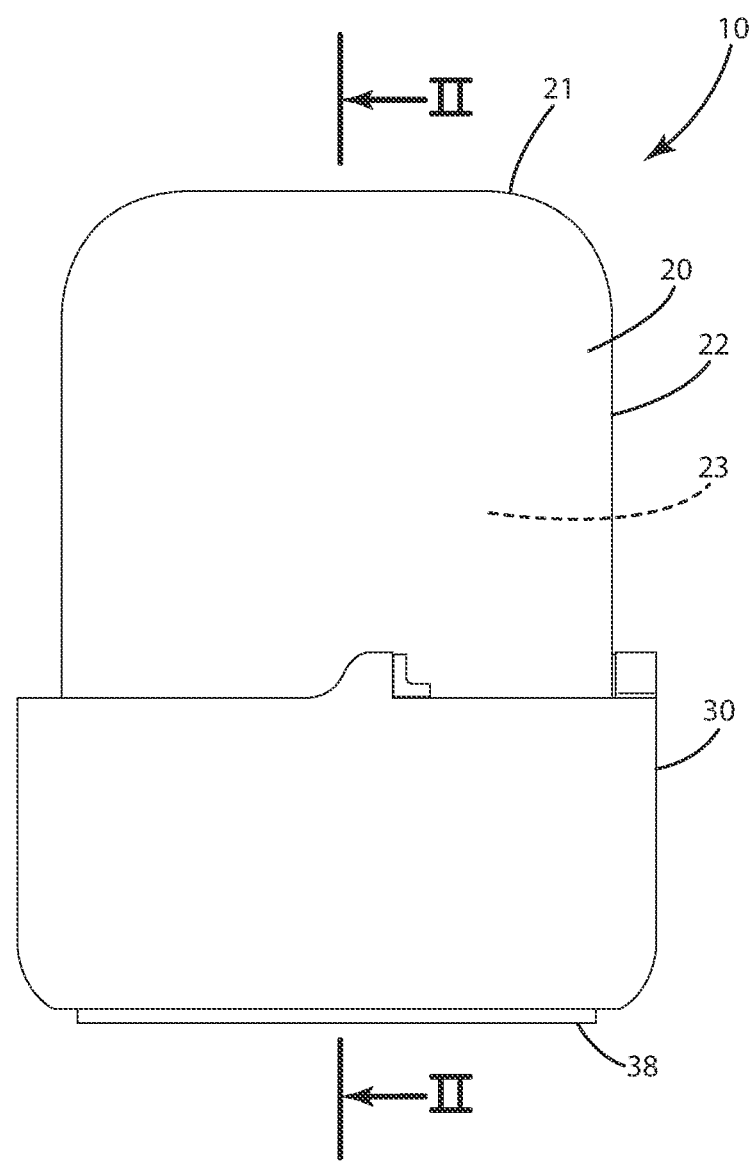
FIG. 1 is a perspective view of a spin on filter of a current embodiment being installed on a threaded adapter.
Figure 1:
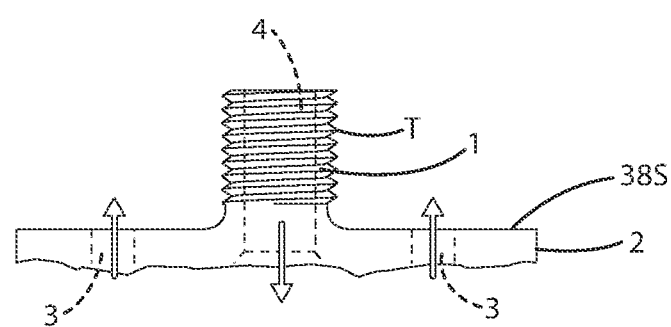
Figure 2:
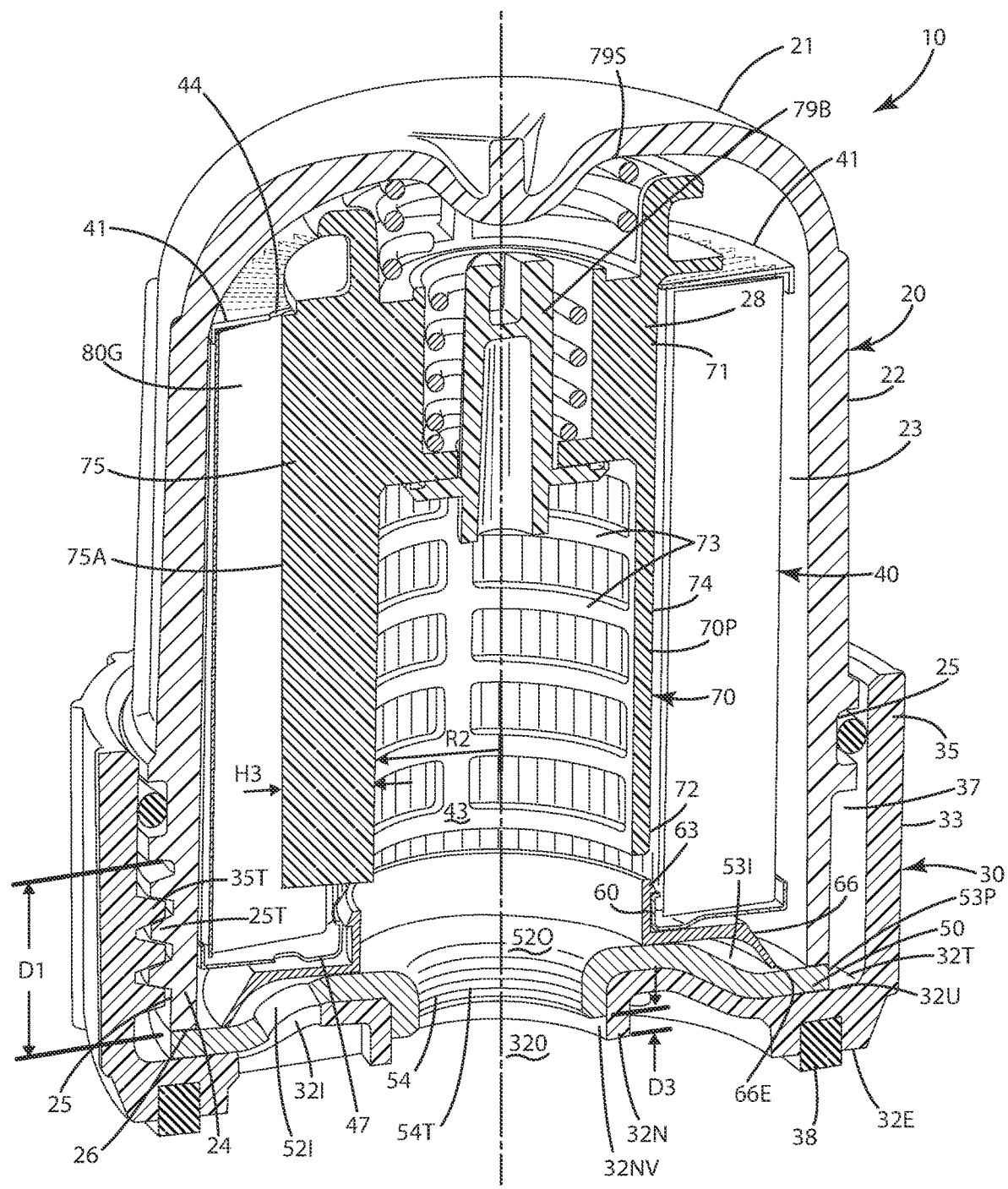
FIG. 2 is a perspective section view of the filter illustrating a reinforcing plate and a filter element with a registration groove within which a registration rib from a support tube is positioned.
Figure 3:
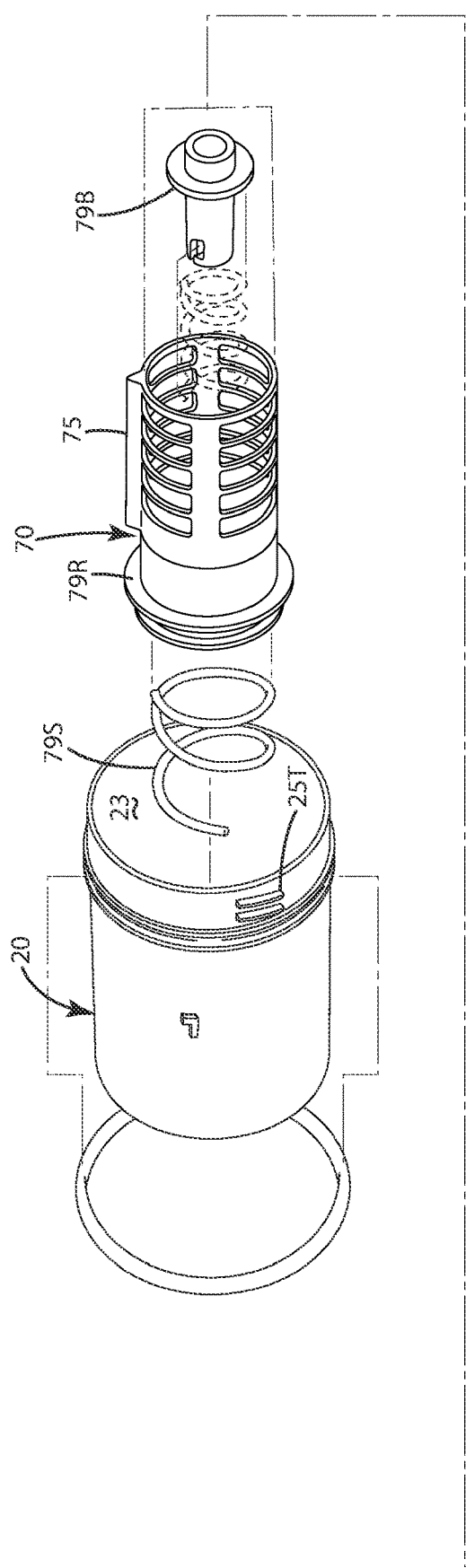
FIG. 3 is an exploded view of the filter.
Figure 3:
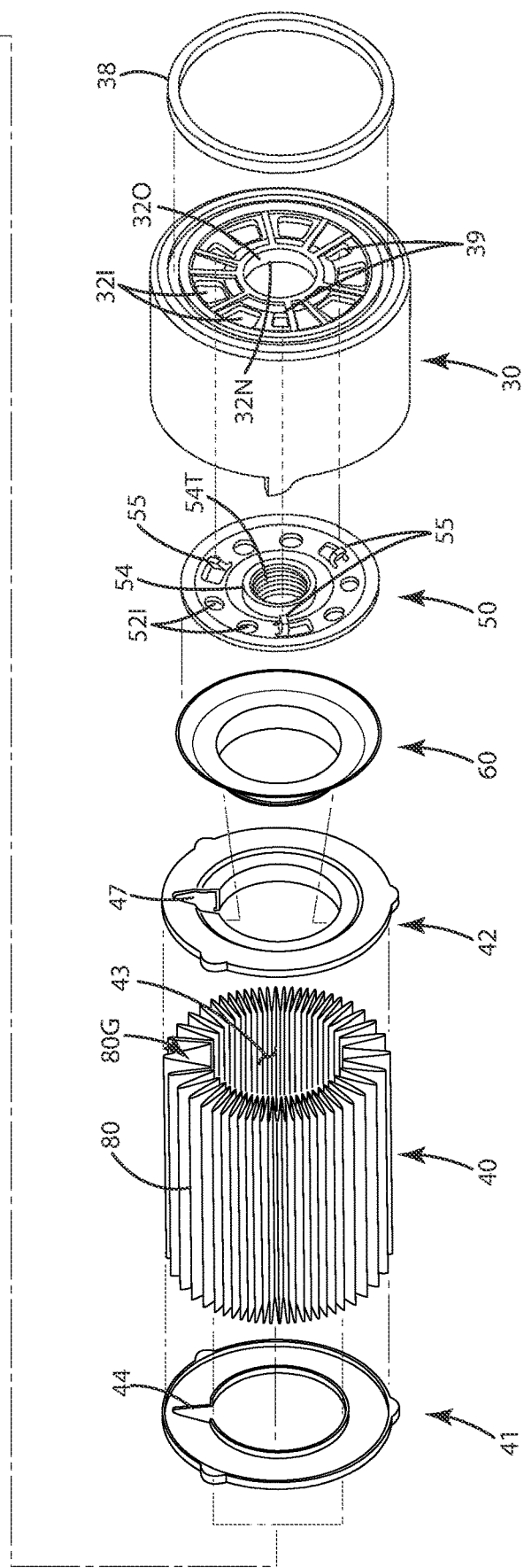

A current embodiment of the spin on filter is shown in FIGS. 1-3 and generally designated 10. The filter 10 is shown installed in a threaded adapter 1 having threads T. The adapter can extend from a component of an engine, hydraulic system or any other device with circulating oil, hydraulic fluid or other liquids, referred to herein generally as oil. The adapter can include oil ports 3, which feed oil to inlet ports of the filter 10, and a central port 4, which receives filtered oil back from the filter 10. The filter 10 can include threads 54T, which optionally can be part of a reinforcing plate 50 as described below. The filter 10 can further include a cover 30 to which a housing 20 is removably joined via threads. The filter houses the filter element 40, which can be removed and replaced, in some cases manually, without the use of tools, with a new, different replacement filter element to filter oil passing through the filter 10.

Referring to FIG. 2, the filter 10 can include a housing 20 having upper wall 21 and a housing sidewall 22 extending downward from the upper wall. The upper wall can be domed to provide strength to it as well. The housing can define a cavity 23 which can be a first cavity that houses all or a portion of the filter element 40 as described below. The sidewall 22 can extend downward from the upper wall 21 and terminate at a lower end 24. The lower end can include threads 25T along a threaded housing portion 25. In some cases, the threads 25T can be located a distance D1 above the lowermost edge 26 of the housing at the end of the lower end. The housing and the cavity 23 can be sized and shaped to receive the filter element 40 and other components, such as an optional bypass valve 79B.

The filter 10 can include a cover 30 including a bottom plate 32, also referred to herein as a base, and a cover sidewall 33 extending upward from the bottom plate 32. The cover sidewall can extend to an upper end 35. A second cavity 37 can be defined by the cover, where that cavity is coextensive with the first cavity 23 of the housing. The first and second cavity can form a common cavity. The upper end 35 can include threads 35T along a threaded cover portion 35 configured to mate with the threaded housing portion 25 so that the housing and cover are removably joined with one another. With this connection, access is provided to the first and second cavities. The housing and cover can be disassembled from one another simply by threading the two parts off from one another so that the threads disconnect. In most cases, this can be achieved by rotating one element relative to the other to disconnect the housing relative to the cover. Such rotation and threading can be done manually, without the use of tools. In other cases, a belt-type filter tool can be used to hold one element while the other is rotated with another belt-type filter tool or manually.

The housing and cover, as well as their respective components, can be constructed from a polymeric material to conserve weight and to promote economical and sustainable recycling. For example, the housing and cover can be constructed from a polyamide, such as polyamide 66, poly vinyl chloride, polypropylene, polyethylene, acrylonitrile butadiene styrene, polytetrafluoroethylene and other polymers. In some cases, the material can be reinforced with fibers, particular, strands, composites or other materials. The reinforcing plate on the other hand can be constructed from a second, different material, such as metal, for example, steel, iron, aluminum, alloys and the like. In some cases, the plate can be constructed from a composite such as carbon or other material that is durable and rigid. Being constructed from a more rigid and durable material than the cover or housing, the reinforcing plate can increase the rigidity and strength of the filter, for example the cover along the bottom plate. The reinforcing plate also can be threaded and can provide a threaded mating surface with the threads T of the adapter 1. Due to its material properties, it can be resistant to stripping and deformation in the threaded region 54T when engaging the adapter 1, which also can be constructed from a metal material.

Figure 4:
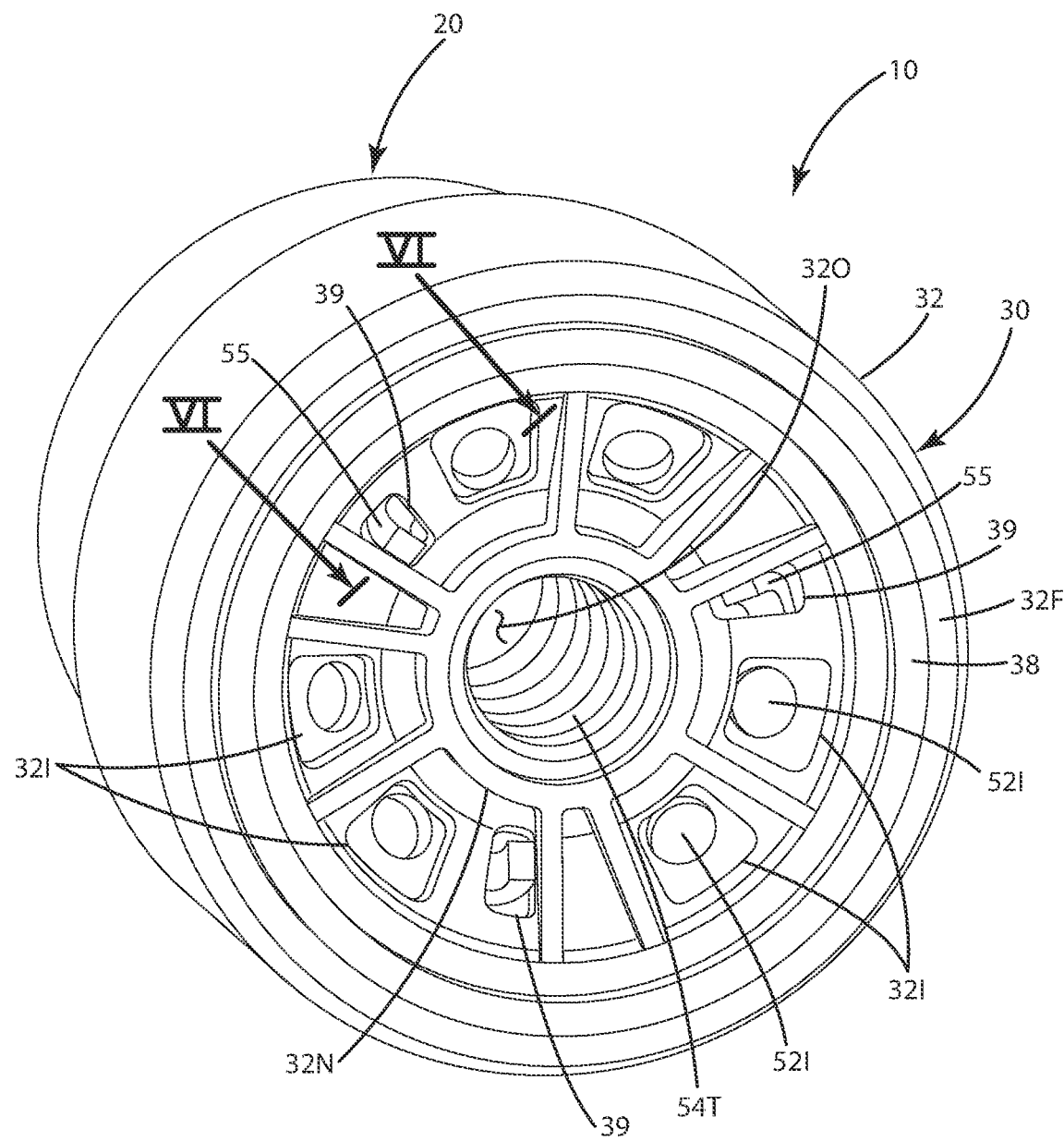
FIG. 4 is a perspective bottom view of the filter showing lock tabs of a reinforcing plate positioned in lock apertures of a bottom plate.

Returning to FIGS. 2 and 3, the bottom plate 32 as shown there can define multiple cover inlet ports 32I radially disposed about a longitudinal axis LA of the cover, housing, reinforcing plate and filter in general. The cover inlet ports 32I can be in fluid communication with the ports 3 of the component 2 to allow oil or other fluid to enter the filter 10. The bottom plate 32 can define a cover outlet port 32O aligned with the longitudinal axis LA, optionally centered on that axis. The cover outlet port can be in fluid communication with the port 4 of the component 2 to allow oil or other fluid to exit the filter. The cover inlet ports 32I can be displaced radially outward from the central cover outlet port 32O as shown in FIG. 4, and generally can be placed circumferentially around the cover outlet port. The ports can be evenly spaced about the outlet port, or can be grouped in groups of two, three or four ports as shown in FIG. 4.

The bottom plate 32 can include a bottom plate interior surface 32U and bottom plate exterior surface 32E. The bottom plate exterior surface 32E can include a seal member 38 that extends around all the cover inlet ports 32I and cover outlet port 32O. The seal member 38 can be in the form of an annular or circular seal as shown in FIGS. 2-4. The cross section of the seal member 38 can be generally rectangular or square. Of course, other shapes can be selected depending on the application. This seal member can be placed against and form a liquid tight seal against the adapter seal surface 38S when the filter 10 is installed and threaded on the adapter 1.

The bottom plate 32 can also define a neck or collar 32N disposed inward from the seal member 38, and inward from the inlet ports, closer to the longitudinal axis LA. This neck 32N of the bottom plate 32 can circumferentiate or surround the longitudinal axis LA and a collar 52 of the reinforcing plate 50 described below. The neck can extend outward and away from the interior surface 32I of the bottom plate 32 a preselected distance that allows the filter to be threaded onto the adapter 1 and the seal member to seal against the sealing surface 38S. The neck 32N can also be void of any threads, and can include an internal bore or void 32NV into which the collar 52 of the reinforcing plate 50 can project. Optionally, the collar 52 can be inset a distance from the outermost part of the neck 32N.

Figure 6:
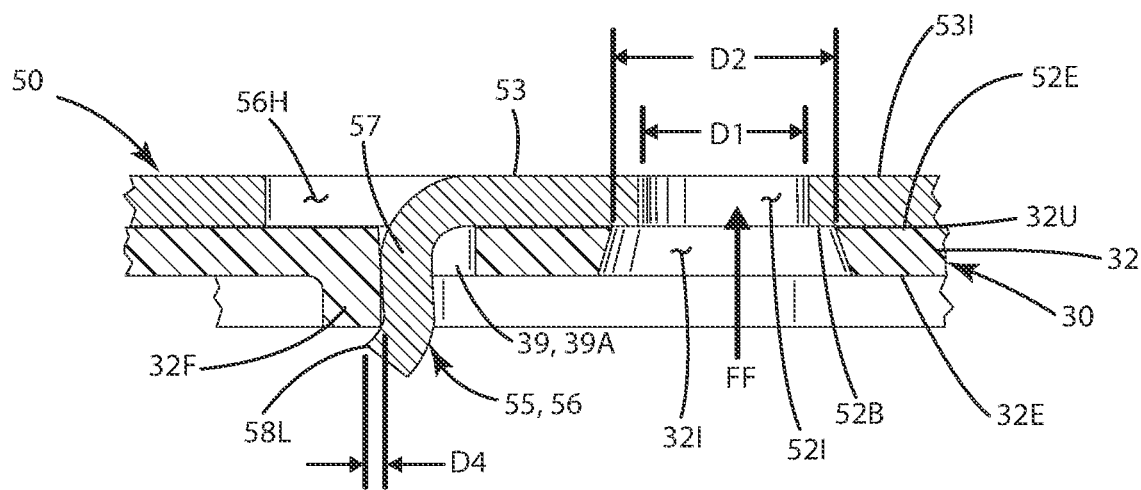
FIG. 6 is a section view of the lock tabs of the reinforcing plate located in and locking with lock apertures of a bottom plate of a cover of the filter.

With reference to FIGS. 2, 4 and 6, the bottom plate 32 can include one or more cover lock elements 39. These cover lock elements 39 can include multiple cover lock apertures 39A defined in the bottom plate 32, optionally extending from the inner plate surface 32U to the lower surface 32E, and forming a through hole through the bottom plate. Optionally, the apertures can be in the form of recesses as described below, and do not extend from one surface to the other. The cover lock apertures 39A can be disposed among and between the cover inlet ports 32I.

As shown in FIG. 4, the cover lock apertures can be disposed radially outward from the cover outlet port 32O, and can be disposed around that port. The lock apertures optionally can be disposed about the longitudinal axis LA at 120 degree increments as shown. In other applications, there may be more or fewer apertures, such that they can be placed at 90 degree increments from one another, or 180 degree increments, or some other angular or spatial orientation about the longitudinal axis LA. Further, although shown as being equally distanced from the longitudinal axis LA, these apertures can be spaced at other distances, which are equal, greater than or less than one another. The lock apertures also can be spaced at different, unequal distances from one another and at different distances from the longitudinal axis LA.

With reference to FIGS. 2-6, the filter can include the reinforcing plate 50. This plate can be constructed from a different material than the cover, such as metal. The reinforcing plate 50 can be disposed adjacent the bottom plate 32, inside the cover 30, optionally inside the second cavity 37 or generally inside the cavity 23 of the housing when the filter is assembled. The reinforcing plate can optionally be disposed adjacent and engaging the bottom plate interior surface 32I. The reinforcing plate 50 can define plate inlet ports 52I radially disposed about the longitudinal axis LA. These plate inlet ports 52I can be aligned with the cover inlet ports 32I and configured to allow fluid to enter the filter. Optionally, the ports 52I can be aligned with the ports 32I of the bottom plate as shown in FIG. 6. The oil can flow in direction FF through the aligned ports. In some cases, the ports can be offset from one another, but can still provide fluid communication between one another so that oil can enter the filter.

The ports 52I and the ports 32I can be optionally of different shapes. For example, the ports 52I can be of a circular shape, while the ports 32I can be polygonal or square shapes. The ports also can be of different dimensions in the plates. For example, the ports 52I can be of a first dimension D1, while the ports 32I can be a second dimension D2. The second dimension can be greater than the first dimension. In this case, the plate inlet border 53B around the ports 52I can be exposed through the inlet ports 32I. Optionally, although not shown, the ports 52I and 32I can be the same size and shape.

Figure 5:
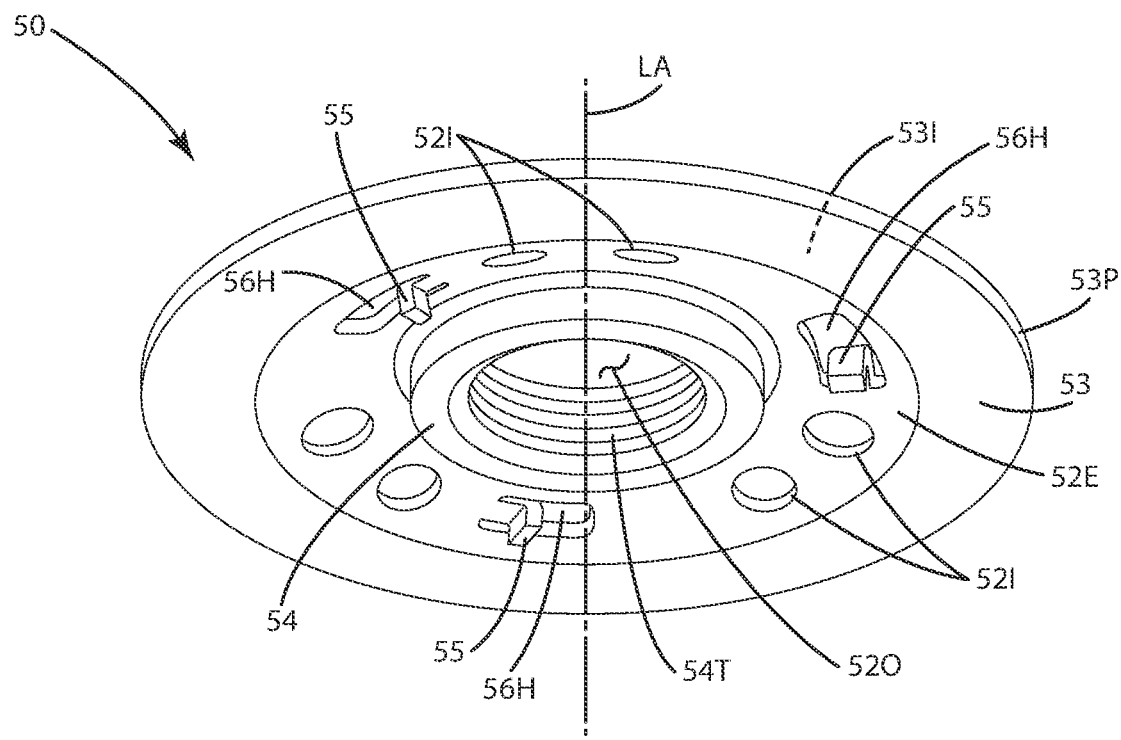
FIG. 5 is a perspective bottom view of the reinforcing plate with lock tabs positioned between and among inlet ports defined by the plate.

As shown in FIG. 5, the reinforcing plate 50 can define a plate outlet port 52O aligned with the cover outlet port 32O and configured to allow fluid to exit the filter 10. The plate outlet port 52 can include a threaded plate portion 54T configured to threadably couple the filter to the threaded adapter 1. The reinforcing plate can include a collar 54 defining the cover outlet port. The threads 54T can be formed on the interior surface of this collar. These threads can threadably couple the filter 10 to a threaded adapter 1. The reinforcing plate 54 can include a base 53 extending outward from the collar to an outer perimeter 53P. The plate inlet ports 52I can be defined in the base 53 between the collar 54 and the outer perimeter 53P. That outer perimeter 53P can be disposed adjacent a transition corner between the bottom plate and the cover sidewall in some applications.

Figure 7:
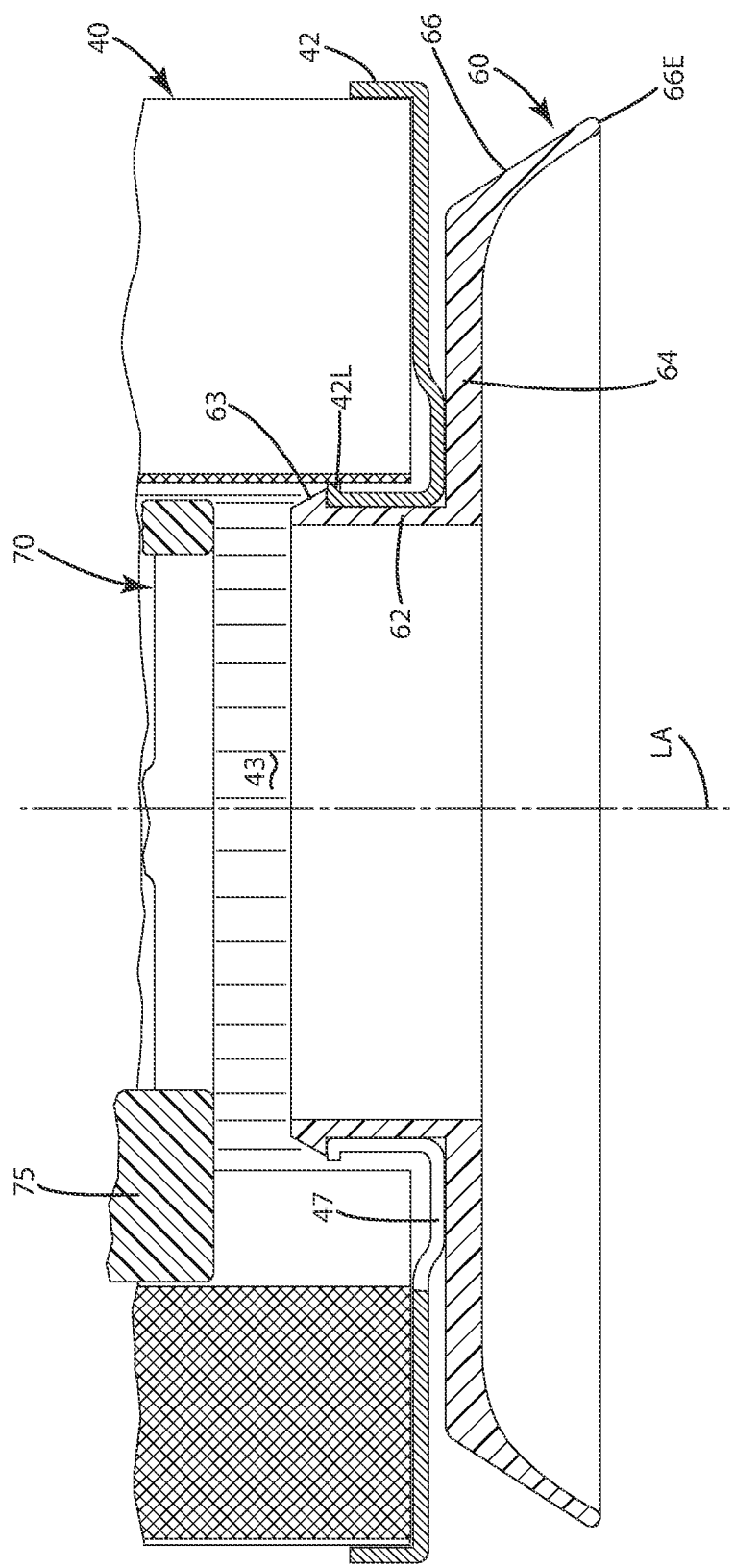
FIG. 7 is a section view of the filter element of the filter with a non-return valve snap fit with the bottom end of the filter element.

Optionally, the filter 10 can include a non-return valve 60. This non-return valve 60 can be located between the plate 50 and the filter element 40. In particular, as shown in FIGS. 2 and 7, the non-return valve can be secured to the filter via a flange ring 62 that extends up from an annular base 64. The ring 62 can include a shoulder 63 that can snap fit to the edge of the end cap of the filter element securing it to the element. The non-return valve 60 thus can be removable and replaceable with the filter element due to this connection to the filter element when replaced. The ring and/or shoulder can be configured to resiliently bend or flex inward toward the longitudinal axis LA when it is pressed into the central passage 43 of the filter element 40. When the shoulder passes the second end cap 42, and in particular the lip 42L, the shoulder automatically moves outward over the lip, sometimes snapping into place there, and away from the longitudinal axis LA. In so doing, the shoulder locks in place over the lip so that the non-return valve is secured to the filter element 40 and the second end cap 42 thereof.

The non-return valve base 64 can extend radially outward from the longitudinal axis LA to a rim 66. This rim 66 can include an edge that engages the interior plate surface 53I of the reinforcing plate when the filter is assembled. The rim can engage the plate surface 53I in a location radially outward from all the inlet ports 52I. Generally, however, the non-return valve can extend outward over the plurality of plate inlet ports 52I but not over the plate outlet port 52O. The non-return valve can be constructed from a polymer or silicone. The non-return valve can be flexible and resilient so that the rim and/or base can flex and move when sufficient force from the pressure of incoming inlet oil projects through the inlet ports in the cover and the plate. When it does so, the rim and/or edge can break contact from the perimeter of the reinforcing plate to allow oil to pass between the plate and the edge. The valve can then flex back after the pressure and force subsides, allowing the rim to re-contact the reinforcing plate to prevent oil inside the filter from exiting the filter through the inlet ports.

Returning to the reinforcing plate, the collar 54 of that plate 50, as mentioned above, can be threaded and can form the outlet port of the filter. The collar 54 can fit within and inside the neck 32N of the bottom plate. The neck optionally can project beyond the collar a distance D3 as shown in FIG. 2. The collar can be threaded, while the neck 32N might not be threaded. Again, with the plate 50 constructed from metal, this can allow the stronger plate to interface with the adapter, rather than the polymeric bottom plate 32. With the plate 50 on the interior surface 32U of the bottom plate, when the threads 54T are tightened on the adapter and its threads T, the plate can pull the bottom plate, cover and filter in general closer to the adapter, and can engage the seal member against the seal surface.

The reinforcing plate 50 can include a plate lock element 55. This element 55 can register with the cover lock element 39 and fixedly secure the reinforcing plate to the bottom plate 32, and the cover 32 in general, to prevent rotation and/or separation of the reinforcing plate relative to the cover. The plate lock element 55 can include one or more plate lock projections 56 that project into respective ones of the cover lock apertures 39A. Optionally, the plate lock element includes multiple ribs, spaced among the plate inlet ports 52I. As described above, the cover lock element 39 can include multiple apertures 39A, spaced among the cover inlet ports 32I. Each respective rib can project into a respective aperture to fixedly secure the reinforcing plate to the cover to prevent rotation and separation of the reinforcing plate relative to the bottom plate.

As shown in FIGS. 4 and 5, the plate lock projections 56 can be disposed radially outward from the plate outlet port 52O, and can be disposed around that port. The projections optionally can be disposed about the longitudinal axis LA at 120 degree increments as shown. In other applications, there may be more or fewer projections, such that they can be placed at 90 degree increments from one another, or 180 degree increments, or some other angular or spatial orientation about the longitudinal axis LA. Generally, however, the number of projections can be equal to the number of apertures, and spaced similarly about the longitudinal axis so that the projections can engage the apertures and secure the reinforcing plate to the bottom plate. Further, although shown as being equally distanced from the longitudinal axis LA, the projections can be spaced at other distances, which are equal, greater than or less than one another. The projections also can be spaced at different, uneven distances from one another and at different distances from the longitudinal axis LA, but again, the spacing and location of the projections can match that of the apertures so the two can interlock and hold the plates relative to one another. Optionally, as will be appreciated, the projections and apertures on the plates can be reversed, so that the reinforcing plate 50 includes the apertures and the bottom plate 32 includes the projections. The projections and apertures also can be mixed and matched between the plates 50 and 32, depending on the application.

With reference to FIGS. 5 and 6, the interaction of an exemplary plate lock element and cover lock element will be further described. As shown there, the plate lock element 55 is in the form of a projection 56, which can be a tab. This tab 56 can be stamped from the base 53, leaving a hole 56H where the material forming the tab 56 is removed from. The tab can be angled or bent downward and can include a curved or angled stem 57. The stem can project to a head 58, and that head 58 can include a lip or nib 58L. The tab 56 and stem can extend through the cover plate element 39 in the form of an aperture 39A. The tab can extend past the interior surface and the exterior surface of the bottom plate 32. The head 58 can project beyond the exterior surface 32E of the bottom plate as well. In some cases, the bottom plate 32 can include a shoulder or flange 32F reinforcing the area around the aperture. The lip 58L can extend over the flange 32F a distance D4. Optionally, the stem or head can be bent, folded or crimped to clamp or forcibly engage the flange 32F or the material surrounding the aperture 39A, and/or to overlap the flange or material the distance D4. This can further secure the reinforcing plate to the bottom plate. Of course, such extra clamping or joining can be dependent on the application.

Optionally, although shown as a stamped tab 56, the plate projection can be in the form of a fastener secured to the plate, or a welded part secured to the plate, or another type of projection simply attached by adhering, melting or otherwise joining to the plate, optionally extending from the bottom plate exterior surface 52E. Further, although shown as an aperture 39A extending through the bottom plate, the cover apertures can be in the form of recess or holes that are formed by pressing the projections of the reinforcing plate 50 into the bottom plate 32 of the cover. The projections can stab or deform the bottom plate as they enter the interior surface, and can effectively lock in place with that surface and the bottom plate to impair relative rotation or separation of the bottom plate and reinforcing plate.

The reinforcing plate 50 and the cover 30 of the filter 10 can be joined in a method of manufacturing the filter. The method can include positioning the reinforcing plate 50 adjacent the bottom plate 32 so that the plate inlet ports 52I are in fluid communication with the cover inlet ports 32I, and so that a plate outlet port 52O is in fluid communication with the cover outlet port 32O. Where the reinforcing plate includes the collar 54 with threads 54T, the collar can be placed in the neck 32N of the bottom plate extending around the cover outlet port 32O.

The plate lock element 55 can be registered with a cover lock element 39 to fixedly secure the reinforcing plate to the cover so that the reinforcing plate is prevented from rotating and/or separating relative to the bottom plate. To do so, optionally, the tabs 56 of the reinforcing plate 50 can be aligned with and projected through the respective plate apertures 39A of the bottom plate 32. The head 58 can extend beyond the exterior plate surface 32E. The stem 57 can extend within the aperture. Optionally, the tabs 56 can be bent or crimped to push the lip or head against the flanges 32F adjacent the apertures 39A.

The filter 10 can be assembled by installing a replaceable filter 40 element having a central opening aligned with the cover outlet port, so that the filter element is removably disposed in the cover 30 so that the filter element 40 can be selectively removed from the filter 10. The housing 20 can be rotated so its threaded housing portion joins with the threaded cover portion, with the replaceable filter element disposed in the cavity 23, to house the filter element 40 in the filter 10. In some cases, the lower edge 26 of the housing can engage the reinforcing plate, for example, the outer perimeter, and can clamp the reinforcing plate between the edge 26 and the bottom plate 32. Optionally, the non-return valve 60 can be installed in the cover 30 over the reinforcing plate 50 so that the non-return valve 60 contacts an interior surface 53I of the reinforcing plate but not the bottom plate 32, and so the non-return valve covers the inlet plate ports 52I.

As mentioned above, the spin on filter 10 can include a removable and replaceable filter element 40. With this removable filter element, the filter can be recharged with a new, different filter element rather than consuming the entire filter and all its components. For example, the cover, reinforcing plate, housing, bypass valve and support tube can be reused with the new filter element, among other things. The filter element and optionally the non-return valve can be replaced with new ones. This can reduce the number of components of the filter that is discarded and or that has to undergo recycling. Where the filter element is replaceable, it and other components of the filter 10 can include certain registration features to ensure the filter element is suitably indexed and aligned with the components of the filter, and/or so that a high quality, authorized filter element is used in connection with the filter to filter contaminants from oil circulating through the filter. The following description is that of the replaceable filter element and associated registration elements.

To begin, when installed in the filter 10, for example in the housing 20 and cover 30, the filter element 40 can be located in one or both of the first cavity 23 and the second cavity 37 of the respective housing and cover. When so installed, a central passageway or central opening 43 of the filter element 40 can be aligned with the cover outlet port 32O and the aligned plate outlet port 52O so that these elements are in fluid communication, optionally along a flow path coincident with the longitudinal axis LA. This central passageway can be sized and shaped to receive therein a support tube 70 which can optionally be separable and removable from the filter element.

The support tube 70 can extend from an upper or first end 71 to a lower or second end 72. The second end can be disposed a distance from the non-return valve 60 located at the bottom of the filter element 40. The support tube can include multiple horizontal cross members or rings 73 and vertical cross members 74 that intersect one another and form a generally cylindrical tube. The outer surfaces of these members or other components of the support tube 70 can form an exterior tube perimeter 70P, which can be generally round, circular and/or cylindrical. The upper end of the support tube 70 can be joined with, or adjacent a bypass valve 79B, above the support tube, which can be adjacent a retaining spring 79S that presses against the housing 20 to hold the filter element in place via a rim 79R pressing against the first end cap 41 of the filter element 40.

The support tube can extend through the cavity and within the central passageway as mentioned above. The support tube can have a length L2 that is shorter than the length L1 of the central passageway of the filter element. Accordingly, the support tube as shown does not reach the second end cap 32 of the filter element when the support tube is fully installed in the filter element. Of course, in some applications, the lengths L1 and L2 can be equal or L2 can be greater than L1.

Figure 10:
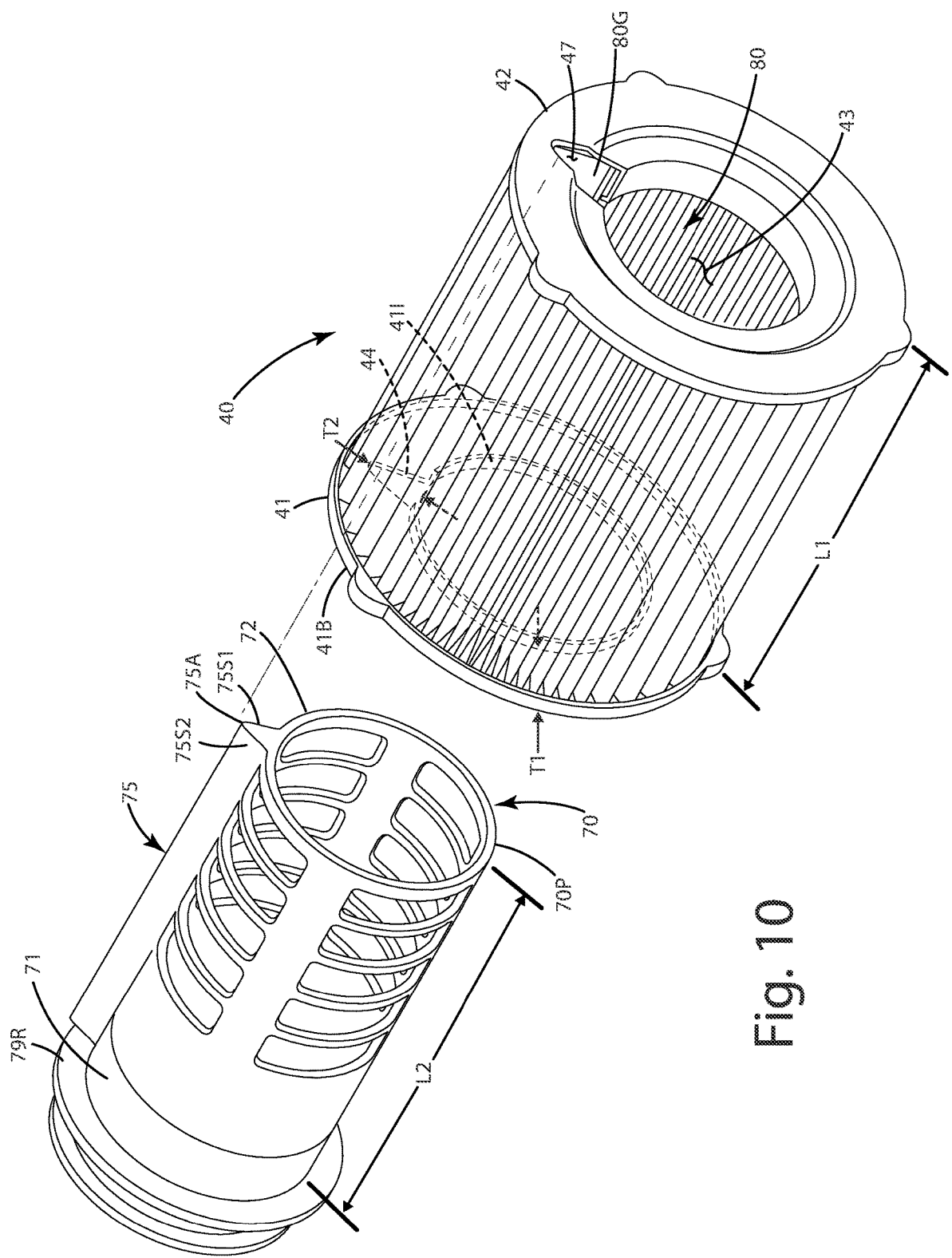
FIG. 10 is a perspective view of a support tube with a registration rib entering a filter element having a registration groove and pleat groove to index the element relative to the support tube.

The support tube also can include a registration rib 75. With reference to FIGS. 2, 3 and 10, the registration rib can interrupt the exterior tube perimeter 70P. The rib 70 can extend along the length L2 of the support tube and outward from the longitudinal axis LA, with which the rib can be parallel. The rib can terminate near or at the second end 72 of the support tube, or optionally can extend slightly beyond. The rib can be shorter than, equal to or greater than the lengths L1 and/or L2. The rib can be joined with one or more of the rings 73 and/or one or more of the vertical members 74. The rib can be generally triangular, rectangular, polygonal, rounded or of other shapes along its length. The rib can include an apex 75A at the location where it is farthest from the longitudinal axis LA. The apex can be rounded, flat, pointed or angular, depending on the application. The apex can transition to sidewalls 75S1 and 75S2 that extend back to the support tube and the rings. The rib can include a height H3. This height can be less than a radius R2 of the support tube as shown in FIG. 2. Optionally, the height H3 and radius R2 can be equal in other applications. The ratio of the height H3 to the radius R2 can be optionally less than 1:1, less than 1:2, or less than 1:3, depending on the application.

The registration rib can extend between the first end cap 41 and second end cap 42 of the filter element 40 when the filter element is installed in the filter 10. The registration rib can be configured to align with a first end cap groove 44 and a longitudinal pleat groove 84 to index the filter element 40 relative to the support tube 70 when the filter element 40 is installed relative to the support tube 70 to replace a different filter element previously present in the filter 10 as described below.

Figure 8:
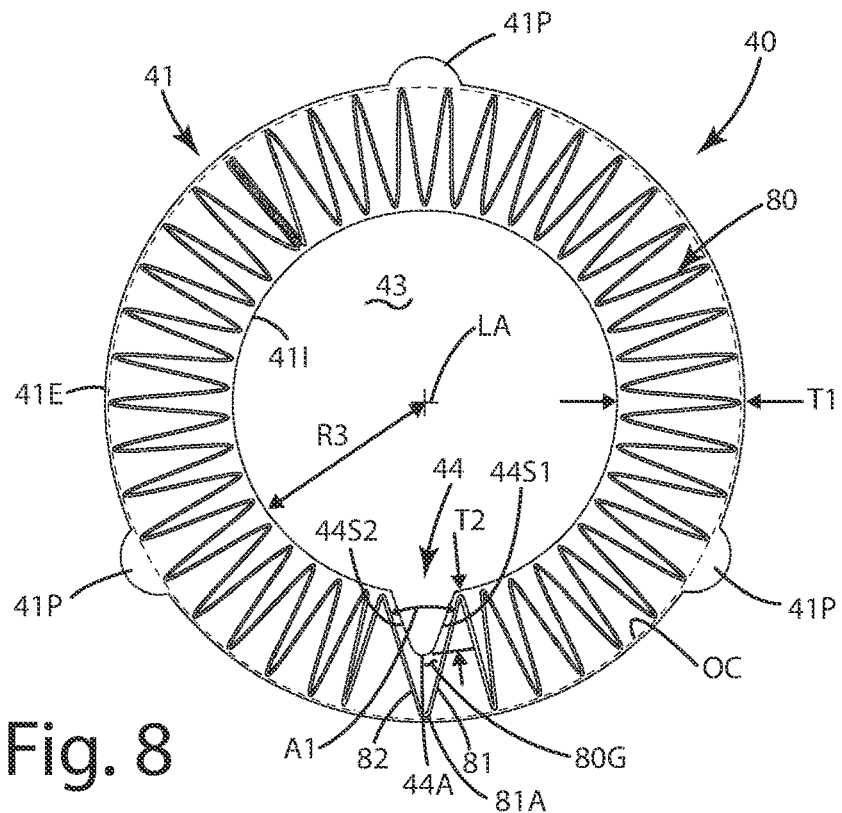
FIG. 8 is a top view of a filter element illustrating an upper filter end cap with a registration groove and a pleat groove aligned therewith.

The filter element 40 as mentioned above can include a first end cap 41 and a second end cap 42, as well as a filter body 45 constructed from and/or including a filter media 80, optionally in the form of a pleated web of material. Of course, other filter media can be used instead of the pleated web. With reference to FIG. 8, the first end cap 41 will be described here, and it will be appreciated that the second end cap 42 shown in FIG. 9, located nearer the bottom plate 32 can be virtually identical and can include the same or similar features. The first end cap 41 can include a base 41B that defines a first central opening 41O aligned with the longitudinal axis LA. The first central opening 41O can be bounded by a first interior perimeter 41I interrupted by the first end cap groove 44 extending away from the longitudinal axis LA. The second end cap can include similar features, with a similar second cap groove 47. Further, the second end cap groove 47 can be coextensive with a pleat grove as described below, and aligned with the first end cap groove on the filter element 40.

The first end cap 41 can include the base 41B. The base can extend outward from the first interior perimeter 41I to a first exterior perimeter 41E. These perimeters can be round or circular as shown, but in other applications can be of other geometric shapes. The perimeters can be separated by a thickness T1 of the base 41B. This thickness can be less than the radius R3 of the first central opening 41O. The first exterior perimeter 41E optionally can include one or more bumps or projections 41P extending outward, away from the outer perimeter. These bumps can be rounded as shown, or can be polygonal or of other shapes depending on the application. The bumps 41P can be equally spaced around the longitudinal axis and along the outer perimeter. The bumps 41P can align with corresponding recesses or channels in the interior of the housing 20.

The first end cap groove 44 can form a generally U or V shape extending away from the longitudinal axis. The groove can include sidewall 44S1 and 44S2 that converge toward one another as they extend away from the longitudinal axis LA. These sidewalls can converge at an apex 44A, which can be rounded, flat and/or angular. Optionally, the grove can be convex outward from the longitudinal axis LA as shown. The sidewalls themselves can be linear, flat and/or rounded, depending on the application and shape of the registration rib 75 with which the groove 44 registers to index the filter element relative to the support tube 70.

The first end cap groove 44 can include a depth or thickness T2 extending outward from the inner perimeter 41I. This depth T2 can be less than the thickness T1 of the base 41B. The thickness T1 also can be less than the radius R3 of the central opening 41O. The depth T2 of the groove can be in a ratio relative to the thickness T1 of the base to ensure that the end cap has sufficient strength to support the filter body and register with the registration rib. For example, the ratio of the T2:T1 can be optionally less than or equal to 1:5, less than or equal to 1:4, less than or equal to 1:3, less than or equal to 1:2, or less than 1:1.

The filter element 40 can include a filter body 45 having filter media 80. As shown the filter media can be in the form of a pleated web 80. The pleated web of material can be elongated sheet or roll of filter media, such as a fibrous and/or paper web. This web can be pleated or folded multiple times so that pleats are formed therein. In particular, the pleated web can include a first pleat 81 and a second pleat 82 angled relative to one another to form a longitudinal pleat groove 80G. These pleats can be angled at an acute angle A1 relative to one another. The first pleat 81 and the second pleat 82 can converge toward one another as the first pleat and second pleat extend away from the central opening 43, away from the longitudinal axis LA and/or away from the interior perimeter 41I. The first pleat and the second pleat optionally can be integral with one another, forming a single continuous piece, at a fold at which the first pleat transitions to the second pleat adjacent an outer circumference OC of the pleated web 80. The first pleat and second pleat can transition to one another, optionally at a fold or bend, near or adjacent the apexes 44A and 47A of the respective grooves in the first and second end caps 41 and 42. The transition of these pleats also can be disposed adjacent the apex 75A of the registration rib 75 when the filter element 40 is disposed on the support tube 70. The pleats 81 and 82 also can extend along and/or adjacent the respective sidewalls and/or edges 44S1 and 44S2 of the groove, as well as the sidewalls 75S1 and 75S2 of the rib, when the support tube is inside the central passageway 43 of the filter.

Figure 9:
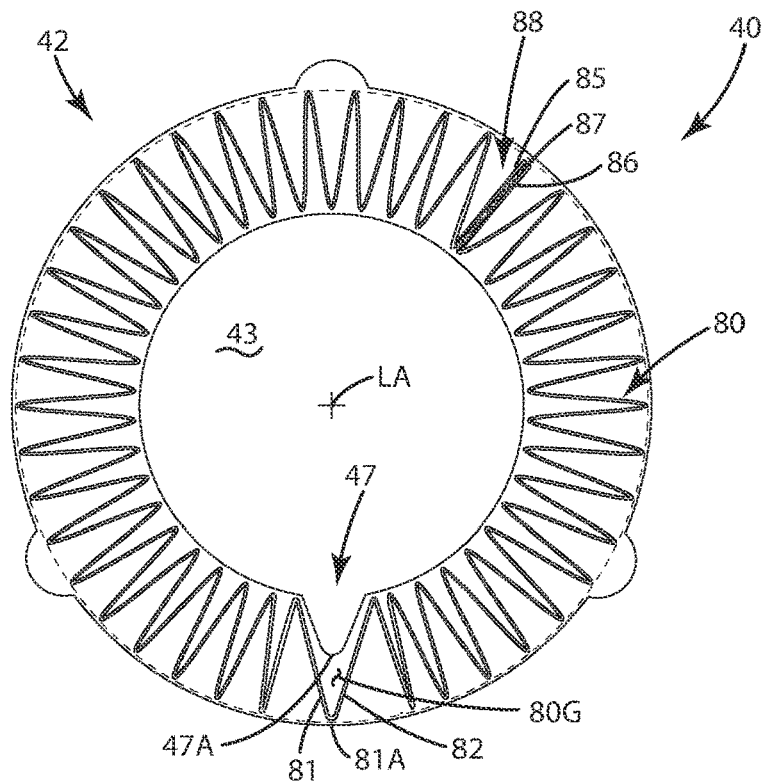
FIG. 9 is a bottom view of the filter element illustrating a lower filter end cap with the registration groove and the pleat groove aligned therewith.

Optionally, the pleated web 80 includes a first end 85 and a second end 86 as shown in FIGS. 8 and 9. These first and second ends can be end pleats or sheets. These ends can be directly joined with one another to form a closure junction 88. This joining can be achieved via cements, adhesives, pressing, stitching, crimping, stapling or other connection features. This closure junction 88 can be distal from the longitudinal pleat groove 80G. This can be helpful because the junction is not prone to excessive stretching, deformation or wear when the registration rib is placed through the pleat groove, in some cases contacting the pleats when so doing. Of course, in some cases, the closure junction can be placed at or near the groove 80G.

The pleated web and the pleat groove can be situated relative to the first end cap groove 41 so that the pleat groove 80G is coextensive and aligned with the first end cap groove 41 as shown in FIG. 8. The pleat groove 80G also can be coextensive and aligned with the second end cap groove as shown in FIG. 9. By coextensive, it is meant that the groove extend in a similar or same direction, so that when the rib is placed in the groove(s), the rib can move through one or more of them with ease.

Various elements of the spin on oil filter 10 may be reused or replaced during servicing in different combinations. Generally, the housing 20, the cover 30, the reinforcing plate 50 where included, the bypass valve and the support tube 70 can be reusable. The filter element 40 and optionally attached non-return valve can be removed from the other elements and disposed of in various combinations during servicing. These elements also can be replaced with new ones, to recharge the filter 10.

A method of using the spin on filter 10 and the filter element 40 will now be described with reference to FIGS. 3 and 8-10. Generally, the method can include providing the filter element 40 comprising the filter body constructed from a pleated web 80 and a first end cap 41 that defines a first central opening 41O aligned with a longitudinal axis LA. The first central opening can be bounded by a first round interior perimeter 41I interrupted by a first end cap groove 44. The pleated web 80 can include a first pleat 81 and a second pleat 81 distal from one another to form a longitudinal pleat groove 80G that is coextensive and aligned with the first end cap groove 44.

The method can include moving the filter element 40 relative to the support tube 70, which may or may not be inside the housing and its cavity. The support tube 70 can include its tube perimeter interrupted by the outward extending registration rib 75, so that the support tube enters the central passageway 43 of the filter element 40. The registration rib can align with at least one of the first end cap groove 44 and the longitudinal pleat groove 80G when the filter element 40 moves relative to the support tube in the central passageway. Indeed, these elements can slide relative to one another as the rib enters the passageway. As a result, the registration of the rib with the first end cap groove and the pleat groove, or some other groove of the filter body where it is not pleated, can index the registration rib relative to the at least one of the first end cap groove and the longitudinal pleat groove. This can ensure that the filter element fits on the support tube in a particular orientation, and the support tube fits in the central opening of the filter element.

Optionally, as shown in FIGS. 2 and 7, when the support tube 70 is installed, its second end 72 might not extend to the second end cap 42. In this case, the rib 75 might not extend through or within the second end cap groove 47. The rim 79R of the support tube, however, can press against the first end cap 41 to push the filter element down, against the reinforcing plate and/or bottom plate when included.

The method can include providing the cover 30 defining an outlet port and the multiple inlet ports disposed around the outlet port. The filter element can be disposed in the second cavity of the cover. The filter element can be placed so that the central passageway of the filter element aligns with the outlet port. Where included and joined with the filter element 40, the non-return valve 60 can be positioned and pushed downward against the reinforcing plate and/or bottom plate of the cover 30 to form a seal against the same around the inlet ports of those components.

The method can include placing the housing over the cover, and connecting those elements with their respective threaded portions. Where a dirty, used or different filter element is installed in the filter, the housing and cover, of course, can be rotated relative to one another to access the cavity within which that filter element is disposed. That used, different filter element can be removed from the cavity and from the support tube, so that the used filter element moves away from a bottom plate of the cover.

Optionally, the method can include providing the cover including a bottom plate and having a threaded cover portion and defining the cover inlet ports configured to allow fluid to enter the filter, the bottom plate defining a cover outlet port configured to allow fluid to exit the filter, the bottom plate including a seal member that extends around the cover inlet ports and cover outlet port. The filter element can be moved toward the bottom plate so that the cover outlet port aligns with the central passageway. The optional reinforcing plate, constructed from a different material than the cover, can be placed adjacent the bottom plate so that the plate inlet ports are in fluid communication with the cover inlet ports and so that a plate outlet port is in fluid communication with the cover outlet port. The plate lock element can be registered with a cover lock element to fixedly secure the reinforcing plate to the cover so that the reinforcing plate is prevented from rotating relative to the bottom plate. The replaceable filter element having a central opening aligned with the cover outlet port, can be installed, so that the filter element is removably disposed in the cover so that the filter element can be selectively removed from the filter. The housing defining a cavity and having a threaded housing portion can be rotated so that the threaded housing portion joins with the threaded cover portion with the replaceable filter element disposed in the cavity.

Further optionally, the non-return valve can be installed in the cover over the reinforcing plate so that the non-return valve contacts an interior surface of the reinforcing plate but not the bottom plate, and so the non-return valve covers the plurality of inlet plate ports. Where the reinforcing plate includes a collar having threads, the collar can be placed in a neck or flanged ring extending around the cover outlet port. The collar can reinforce that neck, and can function as the threaded attachment for connecting the filter to the adapter.

As used herein, the term "liquid tight" implies generally restrictive or prohibitive of fluid flow. However, "liquid tight" does not exclude the possibility of some minimal fluid flow across a seal in some instances. "Liquid tight" implies a lack of fluid flow across an interface, however, there are instances where "liquid tight" may refer to some instances wherein fluid may still leak or minimally flow across an interface.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A spin on filter for filtering a circulating fluid comprising:
    a housing including an upper wall and a housing sidewall, the housing defining a first cavity, the housing sidewall extending downward from the upper wall and terminating at a lower end, the lower end having a threaded housing portion;
    a cover including a bottom plate and a cover sidewall, the cover defining a second cavity, the cover sidewall extending upward from the bottom plate and terminating at an upper end, the upper end having a threaded cover portion configured to mate with the threaded housing portion so that the housing and cover are removably joined with one another so as to provide access to the first and second cavity, the bottom plate defining a plurality of cover inlet ports radially disposed about a longitudinal axis of the cover, the cover inlet ports configured to allow fluid to enter the filter, the bottom plate defining a cover outlet port aligned with the longitudinal axis, the cover outlet port configured to allow fluid to exit the filter, the bottom plate including a bottom plate interior surface and bottom plate exterior surface, the bottom plate exterior surface including a seal member that extends around the plurality of cover inlet ports and cover outlet port, the bottom plate including a cover lock element;
    a filter element disposed in at least one of the first cavity and the second cavity including a central opening aligned with the cover outlet port, the filter element being removably disposed in the cover so that the filter element can be removed from the filter and replaced with a different filter element;
    a reinforcing plate constructed from a different material than the cover, the reinforcing plate disposed adjacent the bottom plate interior surface, the reinforcing plate defining a plurality of plate inlet ports radially disposed about the longitudinal axis of the cover, the plate inlet ports aligned with the cover inlet ports and configured to allow fluid to enter the filter, the reinforcing plate defining a plate outlet port aligned with the cover outlet port and configured to allow fluid to exit the filter, the plate outlet port having a threaded plate portion configured to threadably couple the filter to a threaded adapter, the reinforcing plate including a plate lock element configured to register with the cover lock element and fixedly secure the reinforcing plate to the cover to prevent rotation of the reinforcing plate relative to the cover.

2. The spin on filter of claim 1,
    wherein the cover lock element includes a plurality of cover lock apertures defined in the bottom plate,
    wherein the plate lock element includes a plurality of plate lock projections that project into respective ones of the plurality of cover lock apertures.

3. The spin on filter of claim 2,
    wherein the plurality of cover lock apertures are disposed among and between the plurality of cover inlet ports,
    wherein the plurality of plate lock projections are disposed among and between the plurality of plate inlet ports.

4. The spin on filter of claim 3,
    wherein the reinforcing plate and the plurality of lock projections are constructed from metal,
    wherein the cover and the bottom plate are constructed from a polymer.

5. The spin on filter of claim 4, comprising:
a non-return valve disposed adjacent the reinforcing plate so that the reinforcing plate is located between the non-return valve and the interior surface of the bottom plate.

6. The spin on filter of claim 1,
wherein the reinforcing plate includes a collar and a base circumferentiating the collar,
wherein the collar extends upward from the base and includes the cover outlet port having the threaded plate portion, with a plurality of threads defined on an interior of the collar about the longitudinal axis.

7. The spin on filter of claim 6,
wherein the filter element includes a first end cap and a second end cap, with a filter media disposed between the first end cap and the second end cap,
wherein the reinforcing plate is located between the first end cap and the bottom plate,
wherein a non-return valve is located between the first end cap and the reinforcing plate.

8. The spin on filter of claim 1,
wherein the reinforcing plate is constructed from metal,
wherein the cover and the bottom plate are constructed from a polymer.

9. The spin on filter of claim 1,
wherein the reinforcing plate includes a collar defining the cover outlet port,
wherein the reinforcing plate includes a base extending outward from the collar to an outer perimeter that is disposed adjacent a transition corner between the bottom plate and the cover sidewall,
wherein the plurality of plate inlet ports are defined in the base between the collar and the outer perimeter.

10. The spin on filter of claim 1, comprising:
a non-return valve secured to the filter element and extending over the plurality of plate inlet ports such that when the filter element is removed from the filter, the non-return valve also is removed from the filter with the filter element.

11. A spin on filter for filtering a circulating fluid comprising:
a housing defining a cavity and having a threaded housing portion;
a cover including a bottom plate and having a threaded cover portion configured to mate with the threaded housing portion so that the housing and cover are removably joined with one another so as to provide access to the cavity, the bottom plate defining a plurality of cover inlet ports configured to allow fluid to enter the filter, the bottom plate defining a cover outlet port configured to allow fluid to exit the filter, the bottom plate including a seal member that extends around the plurality of cover inlet ports and cover outlet port, the bottom plate including a cover lock element;
a filter element disposed in the cavity and including a central opening aligned with the cover outlet port, the filter element being removably disposed in the so that the filter element can be removed from the filter; and
a reinforcing plate constructed from a different material than the cover, the reinforcing plate disposed adjacent the bottom plate and defining a plurality of plate inlet ports, the reinforcing plate defining a plate outlet port, the reinforcing plate being separate and distal from the filter element, the reinforcing plate including a plate lock element configured to register with the cover lock element and fixedly secure the reinforcing plate to the cover,
wherein the plate outlet port of the reinforcing plate includes a plurality of threads constructed from the different material than the cover, the plurality of threads configured to threadably couple the filter to a threaded adapter.

12. The spin on filter of claim 11,
wherein the reinforcing plate includes a collar defining the plate outlet port,
wherein the collar of the reinforcing plate includes the plurality of threads configured to threadably couple the filter to the threaded adapter.

13. A spin on filter for filtering a circulating fluid comprising:
a housing defining a cavity and having a threaded housing portion;
a cover including a bottom plate and having a threaded cover portion configured to mate with the threaded housing portion so that the housing and cover are removably joined with one another so as to provide access to the cavity, the bottom plate defining a plurality of cover inlet ports configured to allow fluid to enter the filter, the bottom plate defining a cover outlet port configured to allow fluid to exit the filter, the bottom plate including a seal member that extends around the plurality of cover inlet ports and cover outlet port, the bottom plate including a cover lock element;
a filter element disposed in the cavity and including a central opening aligned with the cover outlet port, the filter element being removably disposed in the cover so that the filter element can be removed from the filter;
a reinforcing plate constructed from a different material than the cover, the reinforcing plate disposed adjacent the bottom plate and defining a plurality of plate inlet ports, the reinforcing plate defining a plate outlet port, the reinforcing plate being separate and distal from the filter element, the reinforcing plate including a plate lock element configured to register with the cover lock element and fixedly secure the reinforcing plate to the cover,
wherein the plate lock element includes at least one of a projection and an aperture,
wherein the cover lock element includes at least one of a corresponding projection and a corresponding aperture so that the plate lock element and the cover lock element can interface with one another to fixedly secure the reinforcing plate to the cover to prevent rotation of the reinforcing plate relative to the bottom plate.

14. The spin on filter of claim 13,
wherein the plate lock element includes a plurality of ribs, spaced among the plurality of plate inlet ports,
wherein the cover lock element includes a plurality of apertures, spaced among the plurality of cover inlet ports,
wherein each rib projects into a respective aperture.

15. The spin on filter of claim 14,
wherein the bottom plate includes an interior surface that engages the reinforcing plate, and an exterior surface,
wherein the rib projects beyond the exterior surface.

16. The spin on filter of claim 11 comprising:
wherein the bottom plate of the cover includes a neck,
wherein the neck of the bottom plate extends around the plate outlet port,
wherein the neck is void of any threads.

17. A spin on filter for filtering a circulating fluid comprising:
a housing defining a cavity and having a threaded housing portion;

a cover including a bottom plate and having a threaded cover portion configured to mate with the threaded housing portion so that the housing and cover are removably joined with one another so as to provide access to the cavity, the bottom plate defining a plurality of cover inlet ports configured to allow fluid to enter the filter, the bottom plate defining a cover outlet port configured to allow fluid to exit the filter, the bottom plate including a seal member that extends around the plurality of cover inlet ports and cover outlet port, the bottom plate including a cover lock element;

a filter element disposed in the cavity and including a central opening aligned with the cover outlet port, the filter element being removably disposed in the cover so that the filter element can be removed from the filter;

a reinforcing plate constructed from a different material than the cover, the reinforcing plate disposed adjacent the bottom plate and defining a plurality of plate inlet ports, the reinforcing plate defining a plate outlet port, the reinforcing plate being separate and distal from the filter element, the reinforcing plate including a plate lock element configured to register with the cover lock element and fixedly secure the reinforcing plate to the cover, wherein the reinforcing plate includes a collar defining the plate outlet port, wherein the reinforcing plate is constructed from metal, the cover is constructed from a polymer, wherein the reinforcing plate includes a base extending outward from the collar to an outer perimeter, wherein the plurality of plate inlet ports are defined in the base between the collar and the outer perimeter, wherein the collar includes a plurality of threads configured to threadably couple the filter to a threaded adapter, wherein the base includes an interior base surface and an exterior base surface, wherein the plate lock element projects from the exterior base surface, wherein the cover lock element includes a lock aperture, wherein the plate lock element projects into the lock aperture to prevent rotation of the reinforcing plate relative to the bottom plate.

18. A method of making a spin on filter, the method comprising:

providing a cover including a bottom plate and having a threaded cover portion and defining a plurality of cover inlet ports configured to allow fluid to enter the filter, the bottom plate defining a cover outlet port configured to allow fluid to exit the filter, the bottom plate including a seal member that extends around the plurality of cover inlet ports and cover outlet port, the bottom plate including a cover lock element;

positioning a reinforcing plate, constructed from a different material than the cover, adjacent the bottom plate so that a plurality of plate inlet ports are in fluid communication with the plurality of cover inlet ports and so that a plate outlet port is in fluid communication with the cover outlet port;

registering a plate lock element with a cover lock element to fixedly secure the reinforcing plate to the cover so that the reinforcing plate is prevented from rotating relative to the bottom plate;

installing a replaceable filter element having a central opening aligned with the cover outlet port, so that the filter element is removably disposed in the cover so that the filter element can be selectively removed from the filter; and rotating a housing defining a cavity and having a threaded housing portion so that the threaded housing portion joins with the threaded cover portion with the replaceable filter element disposed in the cavity to house the filter element in the filter; and providing a collar on the reinforcing plate, the collar of the reinforcing plate including a plurality of threads configured to couple the spin on filter to a threaded adapter.

19. A method of making a spin on filter, the method comprising:

providing a cover including a bottom plate and having a threaded cover portion and defining a plurality of cover inlet ports configured to allow fluid to enter the filter, the bottom plate defining a cover outlet port configured to allow fluid to exit the filter, the bottom plate including a seal member that extends around the plurality of cover inlet ports and cover outlet port, the bottom plate including a cover lock element;

positioning a reinforcing plate, constructed from a different material than the cover, adjacent the bottom plate so that a plurality of plate inlet ports are in fluid communication with the plurality of cover inlet ports and so that a plate outlet port is in fluid communication with the cover outlet port;

registering a plate lock element with a cover lock element to fixedly secure the reinforcing plate to the cover so that the reinforcing plate is prevented from rotating relative to the bottom plate;

installing a replaceable filter element having a central opening aligned with the cover outlet port, so that the filter element is removably disposed in the cover so that the filter element can be selectively removed from the filter;

rotating a housing defining a cavity and having a threaded housing portion so that the threaded housing portion joins with the threaded cover portion with the replaceable filter element disposed in the cavity to house the filter element in the filter; and installing a non-return valve in the cover over the reinforcing plate so that the non-return valve contacts an interior surface of the reinforcing plate but not the bottom plate, and so the non-return valve covers the plurality of inlet plate ports.

20. A method of making a spin on filter, the method comprising:

providing a cover including a bottom plate and having a threaded cover portion and defining a plurality of cover inlet ports configured to allow fluid to enter the filter, the bottom plate defining a cover outlet port configured to allow fluid to exit the filter, the bottom plate including a seal member that extends around the plurality of cover inlet ports and cover outlet port, the bottom plate including a cover lock element;

positioning a reinforcing plate, constructed from a different material than the cover, adjacent the bottom plate so that a plurality of plate inlet ports are in fluid communication with the plurality of cover inlet ports and so that a plate outlet port is in fluid communication with the cover outlet port;

registering a plate lock element with a cover lock element to fixedly secure the reinforcing plate to the cover so that the reinforcing plate is prevented from rotating relative to the bottom plate;

installing a replaceable filter element having a central opening aligned with the cover outlet port, so that the filter element is removably disposed in the cover so that the filter element can be selectively removed from the filter;

rotating a housing defining a cavity and having a threaded housing portion so that the threaded housing portion joins with the threaded cover portion with the replaceable filter element disposed in the cavity to house the filter element in the filter;

providing a collar on the reinforcing plate, the collar including a plurality of threads; and placing the collar in a flanged ring extending around the cover outlet port.

* * * * *